US010290848B2

(12) United States Patent
Zou et al.

(10) Patent No.: US 10,290,848 B2
(45) Date of Patent: May 14, 2019

(54) LITHIUM SECONDARY BATTERY

(71) Applicants:Dongguan Amperex Technology Limited, Dongguan (CN); Ningde Amperex Technology Limited, Ningde (CN)

(72) Inventors: Minmin Zou, Ningde (CN); Song Li, Ningde (CN); Dengjun Ai, Ningde (CN)

(73) Assignees: DONGGUAN AMPEREX TECHNOLOGY LIMITED, Dongguan, Guangdong Province (CN); NINGDE AMPEREX TECHNOLOGY LIMITED, Ningde, Fujian Province (CN)

( * ) Notice: Subject to any disclaimer, the term of this patent is extended or adjusted under 35 U.S.C. 154(b) by 429 days.

(21) Appl. No.: 14/944,140

(22) Filed: Nov. 17, 2015

(65) Prior Publication Data

US 2016/0141563 A1 May 19, 2016

(30) Foreign Application Priority Data

Nov. 19, 2014 (CN) .......................... 2014 1 0664445

(51) Int. Cl.
*H01M 2/16* (2006.01)
*H01M 10/052* (2010.01)
(Continued)

(52) U.S. Cl.
CPC ....... *H01M 2/1686* (2013.01); *H01M 2/1646* (2013.01); *H01M 2/1653* (2013.01);
(Continued)

(58) Field of Classification Search
CPC .................. H01M 2/1686; H01M 10/0587
(Continued)

(56) References Cited

U.S. PATENT DOCUMENTS

2003/0003355 A1* 1/2003 Ueda .................. H01M 2/0202
429/176
2005/0136325 A1* 6/2005 Fujihara ............... H01M 2/027
429/176
(Continued)

FOREIGN PATENT DOCUMENTS

| CN | 102856578 | 1/2013 |
| CN | 103441230 | 12/2013 |
| CN | 103840115 | 6/2014 |

OTHER PUBLICATIONS

Office action from Chinese Patent Application No. 201410664445.X dated Mar. 4, 2016, and Its English translation (EPO Global Dossier).
(Continued)

Primary Examiner — James M Erwin
(74) Attorney, Agent, or Firm — Ladas & Parry, LLP

(57) ABSTRACT

The present application relates to the field of energy storage devices, in particular to a lithium secondary battery. The battery comprises a shell having a bottom, a cap assembly, a positive terminal, a negative terminal, an electrode assembly and electrolyte, wherein a side wall of the shell comprises a pair of main planes and a pair of side faces, and the opening is arranged opposite to the bottom; the electrode assembly is formed by winding a positive plate, a negative plate and a composite separation film comprising a polymer microporous film layer and a ceramic composite material layer; a first extension portion extends from one end of the positive plate facing the cap assembly and is electrically connected with the positive terminal; a second extension portion extends from one end of the positive plate facing the cap assembly and is electrically connected with the negative terminal; and the air permeability of the composite separation tion film and the thickness of the side faces satisfy the relationship of 0.05 s/(100 mL·μm)≤A/B≤1.0 s/(100
(Continued)

mL·μm). The present application provides a lithium secondary battery capable of improving the safety performance of the battery effectively.

16 Claims, 4 Drawing Sheets

(51) Int. Cl.
 *H01M 10/0587* (2010.01)
 *H01M 2/18* (2006.01)
 *H01M 2/26* (2006.01)

(52) U.S. Cl.
 CPC ............ *H01M 2/18* (2013.01); *H01M 2/26* (2013.01); *H01M 10/052* (2013.01); *H01M 10/0587* (2013.01)

(58) Field of Classification Search
 USPC .......................................................... 429/94
 See application file for complete search history.

(56) References Cited

U.S. PATENT DOCUMENTS

| 2007/0202398 | A1* | 8/2007 | Kim | ....................... | H01M 2/021 |
| | | | | | 429/176 |
| 2010/0015530 | A1* | 1/2010 | Katayama | ................. | H01G 9/02 |
| | | | | | 429/246 |
| 2010/0081052 | A1* | 4/2010 | Morishima | ........... | H01M 2/263 |
| | | | | | 429/211 |

OTHER PUBLICATIONS

Search Report from Office action of Chinese Patent Application No. 201410664445.X dated Mar. 4, 2016, and its English translation (Adobe OCR, Google Translate).

* cited by examiner

LITHIUM SECONDARY BATTERY

CROSS-REFERENCE TO RELATED APPLICATION

This application claims the benefit of and priority to Chinese Patent Application No. 201410664445 filed on Nov. 19, 2014, the disclosure of which is hereby incorporated by reference in its entirety.

TECHNICAL FIELD

The present application relates to the field of energy storage devices, and in particular to a lithium secondary battery.

BACKGROUND

In the related art, a lithium secondary battery is typically manufactured by using a separator as an insulator between a strip-like positive plate and a negative plate, winding the electrode stack spirally to constitute an electrode assembly (or a jelly roll), accommodating the electrode assembly in a shell, and then mounting a cap assembly provided with electrode terminals to the shell. Commonly known prismatic lithium secondary batteries comprise collector plates for collecting a great amount of current within a short time with respect to capacity or output, as shown in FIG. 8. The collector plates are leaded out at both sides of the electrode assembly and extend facing the cap assembly.

To suppress occurrence of a short circuit, it is proposed in the related art to suppress battery overheating due to an internal short circuit by applying a ceramic composite material layer containing inorganic fillers and matrix materials (i.e., binders) on a microporous film layer of a composite separation film.

As the electrode assembly uses the composite separation film having the ceramic composite material layer, the electrode assembly may be thickened, leading to a reduction in volumetric energy density of the lithium secondary battery. When the battery is charged and discharged repeatedly, the electrode plates may expand and shrink significantly and produce a large amount of gas, thereby resulting in deformation of the electrode assembly. The ceramic composite material layer bonded via the binder may come loose due to the expansion and thus be damaged and fall off from the microporous film. Thus, the function of the ceramic composite material layer to suppress battery overheating due to internal short circuit is affected, and the safety performance of the battery is also greatly affected.

SUMMARY OF THE INVENTION

The present application provides a lithium secondary battery capable of improving the safety performance of the battery effectively.

The lithium secondary battery provided according to the present application comprises a shell having a bottom, a side wall and an opening; a cap assembly covering the opening; a positive terminal and a negative terminal arranged on the cap assembly; an electrode assembly and electrolyte arranged in a cavity surrounded by the shell and the cap assembly, wherein
the side wall comprises a pair of main planes and a pair of side faces, the main planes and the side faces are arranged alternatively around the edge of the bottom, and the opening is arranged opposite to the bottom;
the electrode assembly is formed by winding a positive plate, a negative plate and a composite separation film arranged between the positive plate and the negative plate, and the composite separation film comprises at least one polymer microporous film layer and at least one ceramic composite material layer;
a first extension portion extends from one end of the positive plate facing the cap assembly and is electrically connected with the positive terminal;
a second extension portion extends from one end of the negative plate facing the cap assembly and is electrically connected with the negative terminal; and
an air permeability A of the composite separation film and a thickness B of the side faces satisfy the following relationship:

$$0.05 \text{ s}/(100 \text{ mL} \cdot \mu m) \leq A/B \leq 1.0 \text{ s}/(100 \text{ mL} \cdot \mu m).$$

Preferably, the air permeability A of the composite separation film and the thickness B of the side faces satisfy the following relationship:

$$0.2 \text{ s}/(100 \text{ mL} \cdot \mu m) \leq A/B \leq 0.75 \text{ s}/(100 \text{ mL} \cdot \mu m).$$

Preferably, the air permeability A of the composite separation film is 50-500 s/100 mL, and the thickness B of the side faces is 400-1200 μm.

Preferably, the ratio of a size L of the main planes in a direction from one side face to the other to a size W of the main planes in a direction from the bottom to the opening is 1.2-2.5.

Preferably, the side faces are in a curved arc surface configuration.

Preferably,
the positive plate comprises a positive current collector and a positive active material layer coated on the surface of the positive current collector, and the first extension portion extends from the positive current collector; and
the negative plate comprises a negative current collector and a negative active material layer coated on the surface of the negative current collector, and the second extension portion extends from negative current collector.

Preferably, both the first extension portion and the second extension portion are in the form of a trapezoid, and an upper base of the trapezoid extends away from the electrode assembly.

Preferably, a joint of the first extension portion and the positive current collector has a circular arc transition edge, the bottom of the second extension portion and the negative current collector also have a circular arc transition edge, and the circular arcs have a radius of 0.5 mm-20 mm.

Preferably, top portions of the first extension portion and the second extension portion are both provided with a rounded chamfer with a radius of 0.5 mm-20 mm.

Preferably, the ceramic composite material layer comprises inorganic particles and matrix materials.

The technical solutions provided by the present application may have the following beneficial effects.

When the battery is charged and discharged repeatedly, the electrode plates may expand and shrink significantly and produce a large amount of gas, thereby resulting in deformation of the electrode assembly. Especially, due to the force exerted on winding arc surfaces at the side faces of the electrode assembly, the composite separation film of the ceramic composite material layer arranged in the winding arc surface will be severely damaged. However, if the side faces of the battery shell give a reverse thrust to the electrode assembly to suppress the deformation of the electrode assembly, the ceramic composite material layer will not be damaged, the function of the ceramic composite material layer to suppress battery overheating due to internal short circuit will not be affected, and the safety performance of the battery can be improved at the same time.

However, in addition to preventing internal short circuit of the battery, the ceramic composite material layer has to accommodate the electrolyte between the positive and the negative. When the reverse thrust given by the side faces to the electrode assembly is too large, the ceramic composite material layer will be locally devoid of electrolyte. Thus lithium ions cannot pass the composite separation film, and lithium precipitation occurs, which may ultimately affect the capacity of the battery.

In the present application, the winding arc surfaces at the side faces of the electrode assembly may fit tightly with the side faces of the side wall of the shell by leading out the first extension portion and the second extension portion from one end of the electrode assembly facing the cap assembly other than from both sides of the electrode assembly, thus the shell may give reverse thrust to the electrode assembly sensitively for an efficient suppression of an influence of the expansion of the electrode assembly on the ceramic composite material layer. Besides, with such an arrangement, when the electrode assembly is subjected to the reverse thrust from the side faces, even though the electrolyte may diffuse to the surroundings due to a reduction in local concentration, the electrolyte may recover under the influence of gravity, allowing the concentration of the electrolyte to equilibrate gradually. Moreover, as collector plates do not need to be arranged at the sides of the electrode assembly, the volumetric energy density of the lithium secondary battery may also be significantly increased. That the side faces exert sufficient reverse thrust can be effectively guaranteed by limiting the proportional relationship between the air permeability A of the composite separation film and the thickness B of the side faces, and at the same time the influence of the expansion and shrinkage of electrode plates on the battery can be reduced, and various indexes of the battery can be optimized.

It is to be understood that the general description above and a detailed description below are exemplary only, and are not intended to limit the present application.

REFERENCE NUMERALS

Figure 1:
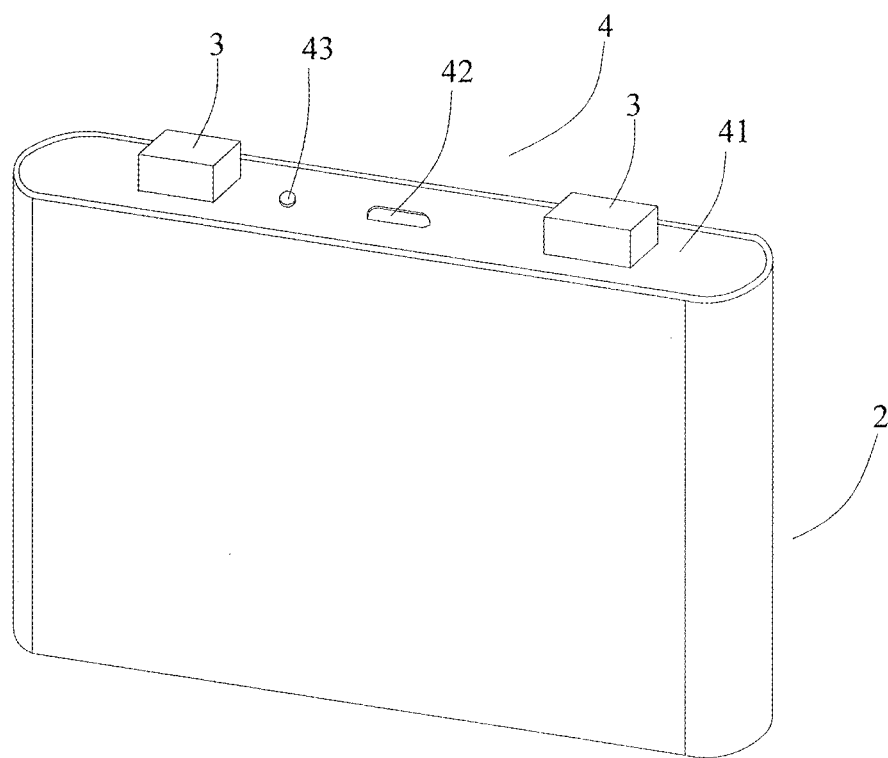
FIG. 1 is a structural schematic view of a lithium secondary battery having side faces in a curved arc surface configuration provided by an embodiment of the present application.

1—electrode assembly; 11—positive plate; 111—first extension portion; 112—positive current collector; 113—positive active material layer; 114—circular arc; 115—rounded chamfer; 12—negative plate; 121—second extension portion; 122—negative current collector; 123—negative active material layer; 13—composite separation film; 131—ceramic composite material layer; 132—polymer microporous film layer; 14—winding arc surface;
2—shell; 21—opening; 22—side wall; 221—main plane; 222—side face; 23—bottom;
3—positive and negative terminals;
4—cap assembly; 41—cap plate; 42—gas discharge portion; 43—plug.

The accompanying drawings, which are incorporated in and constitute a part of the specification, illustrate embodiments consistent with the invention and, together with the description, serve to explain the principles of the invention.

SPECIFIC EMBODIMENTS

A further detailed description will be made below to the present application with reference to specific embodiments and in connection with the drawings. Herein, the words "front", "rear", "left" and "right" designate directions of placement of the lithium secondary battery in the drawings to which reference is made.

As shown in FIGS. 1 to 4, a prismatic lithium secondary battery provided by an embodiment of the present application comprises an electrode assembly 1, a shell 2, positive and negative terminals 3 (which are not distinguished in the figures), a cap assembly 4 and electrolyte (not shown). A detailed description will be made below to each part of the battery.

Figure 2:
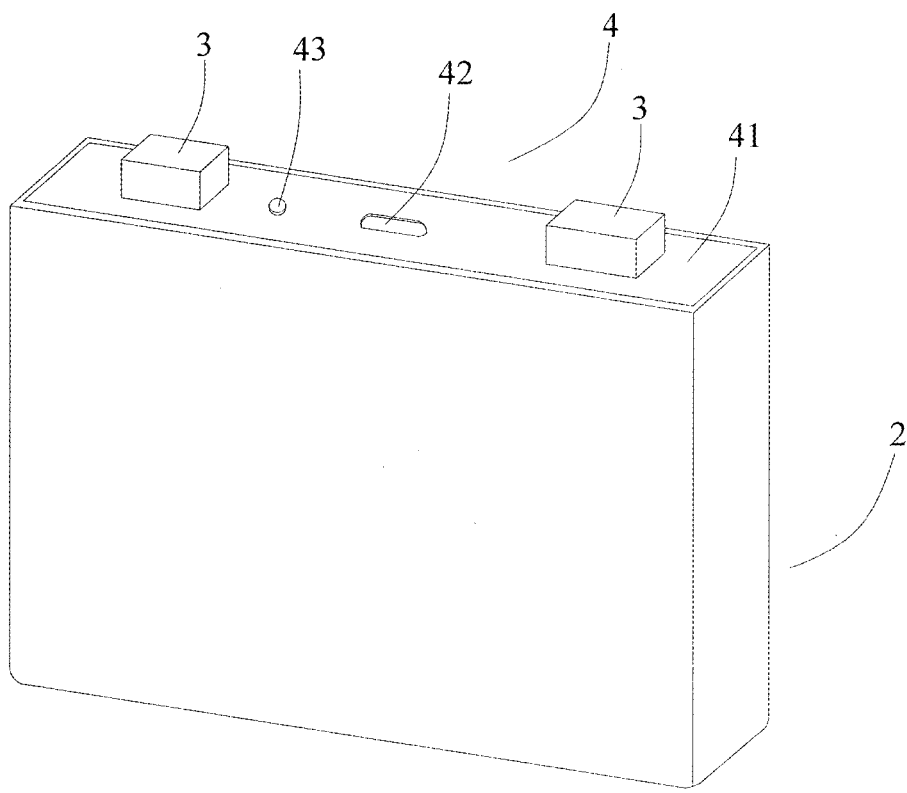
FIG. 2 is a structural schematic view of a lithium secondary battery having side faces in a planar configuration provided by an embodiment of the present application.
Figure 3:
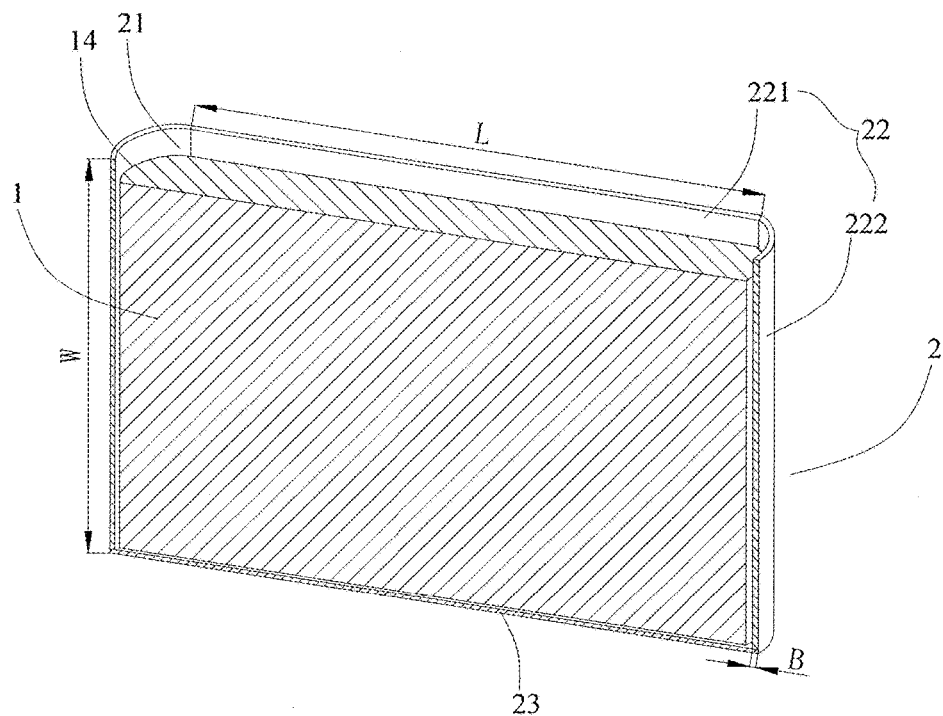
FIG. 3 is a schematic partial cross-sectional view of a lithium secondary battery having side faces in a curved arc surface configuration provided by an embodiment of the present application.

With reference to FIG. 3, the shell 2 comprises an opening 21, a side wall 22 and a bottom 23, wherein the opening 21 is arranged opposite to the bottom 23, the side wall 22 comprises a pair of main planes 221 and a pair of side faces 222, and the main planes 221 and the side faces 222 are arranged alternatively around the edge of the bottom 23. As shown in FIG. 2, the side faces 222 may be in a planar configuration. As there are curved areas on the side faces of the electrode assembly 1, it may be easier for the electrode assembly 1 to protrude into the shell 2 when placed into the shell 2. As shown in FIGS. 1 and 3, in this embodiment, in order to allow the side faces 222 to better exert a reverse thrust to the electrode assembly 1, the side faces 222 are specifically made into a curved arc surface configuration which is adapted to the winding arc surfaces 14 of the electrode assembly 1. The side faces of the electrode assembly 1 also have winding arc surfaces 14 which are similar in shape to that of the side faces 222 and match therewith, thus the side faces 222 of the side wall of the shell is even more sensitive to the reverse thrust given by the winding arc surfaces 14 of the electrode assembly 1, and may accurately react to the deformation of the electrode assembly 1; meanwhile, the electrode assembly 1 makes a more efficient use of space and has an increased volumetric energy density.

Figure 4:
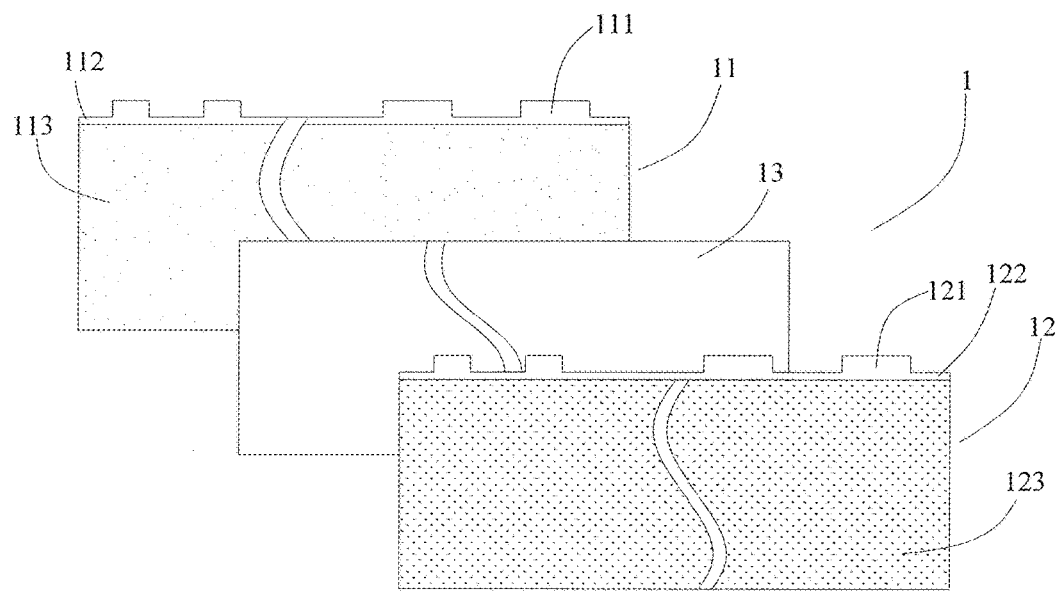
FIG. 4 is an exploded schematic view of the structure of the electrode assembly provided by an embodiment of the present application.

With reference to FIG. 4, the electrode assembly 1 comprises a positive plate 11, a negative plate 12 and a composite separation film 13 arranged between the positive plate 11 and the negative plate 12. The positive plate 11, the negative plate 12 and the composite separation film 13 are stacked together and wound spirally to form the main structure of the electrode assembly 1.

In this embodiment, the positive plate 11 comprises a first extension portion 111, a positive current collector 112 and a positive active material layer 113. The positive active material layer 113 contains a positive active material as the main component, and may optionally contain other components such as conductive agents and binders. There is no particular limitation on these materials, and preferred positive active materials are lithium-containing transition metal oxides, among which lithium iron phosphate, lithium cobaltate, modified lithium cobaltate, lithium nickelate, modified lithium nickelate, lithium manganate, modified lithium manganate and lithium nickel cobalt manganese oxide, for example, are preferred. The positive active material layer 113 is applied on the positive current collector 112. The negative plate 12 comprises a second extension portion 121, a negative current collector 122 and a negative active material layer 123. The negative active material layer 123 contains a negative active material as the main component, and may optionally contain other components such as conductive agents and binders. There is no particular limitation on these materials, and preferred negative active materials include various kinds of natural graphites, various kinds of artificial graphites, composite materials containing silicon such as silicide, lithium metals and various kinds of alloy materials.

Examples of the binders used in the positive active material layer 113 and the negative active material layer 123 include PTFE, PVDF and styrene-butadiene rubber. Examples of the conductive agents include acetylene black and various kinds of graphite materials.

Figure 5:
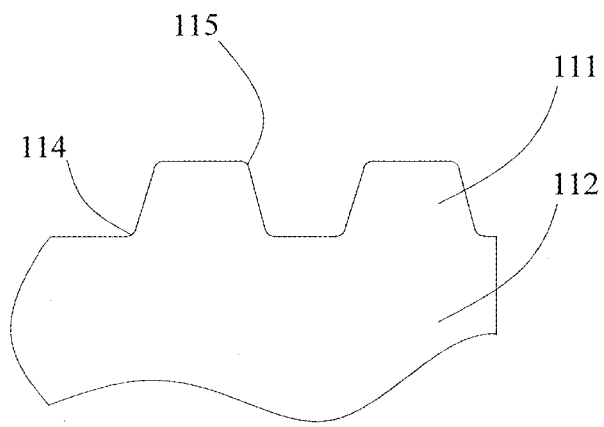
FIGS. 5 and 6 are partial enlarged views of two extensions matching with current collectors provided by an embodiment of the present application.

The first extension portion 111 is provided integrally with the positive current collector 112 and extends outwards from one end of the electrode assembly 1. The second extension portion 121 is provided integrally with the negative current collector 122 and extends outwards from the same end of the electrode assembly 1. When the electrode assembly 1 is disposed within the shell 2, the end of the electrode assembly 1 provided with the first extension portion 111 and the second extension portion 121 face upwards and is connected with the positive terminal 3 and the negative terminal 3, respectively. As shown in FIG. 5, both the first extension portion 111 and the second extension portion 112 are in the form of a trapezoid, and an upper base of the trapezoid extends away from the electrode assembly 1. Thus, weight of the top portion of the extension can be reduced, thereby effectively preventing turnover.

Still refer to FIG. 5, a joint of the first extension portion 111 and the positive current collector 112 as well as the bottom of the second extension portion 121 and the negative current collector 122 may each have a transitional edge defined as a circular arc 114 with a radius of 0.5 mm-20 mm. By providing the transitional circular arcs 114 at the bottom, sharp right-angle areas between the extensions and the current collectors may be rounded so as to reduce burrs produced when the extensions are cut out from the current collectors. Furthermore, the top portions of the first extension portion 111 and the second extension portion 121 may each be provided with a rounded chamfer 115 having a radius of 0.5 mm-20 mm. The rounded chamfers 115 at the top portions may reduce the weight of the extensions, and may also mitigate the problem of corner turnover of the extensions.

Figure 6:
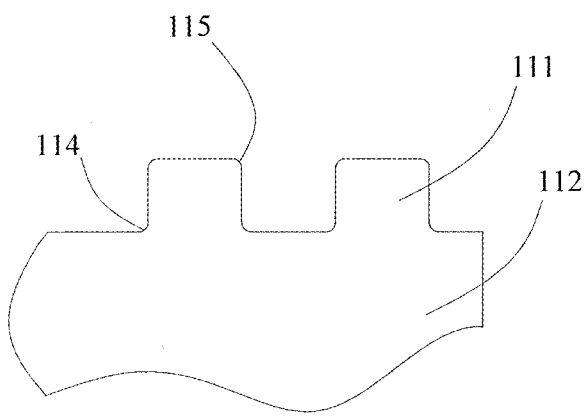

In another embodiment of the present application, as shown in FIG. 6, a rectangular extension may also be adopted to match with the transitional circular arcs 114 and the rounded chamfers 115 at the top portions. Such a structure is simple to machine, and the size thereof is easy to control.

Figure 7:
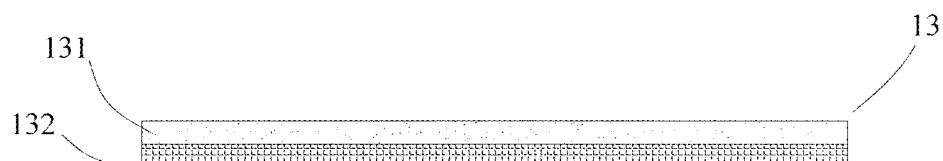
FIG. 7 is a structural schematic view of a composite separation film provided by an embodiment of the present application.

As shown in FIG. 7, the composite separation film 13 comprises a ceramic composite material layer 131 and a polymer microporous film layer 132. The ceramic composite material layer 131 comprises inorganic particles and matrix materials, wherein the inorganic particles may be selected from silicon dioxide ($SiO_2$), aluminium oxide ($Al_2O_3$), calcium carbonate ($CaCO_3$), titanium oxide ($TiO_2$), $SiS_2$, $SiPO_4$ and the like, or mixtures thereof. Preferred inorganic particles are $SiO_2$, $Al_2O_3$ and $CaCO_3$. The particles have an average particle diameter in the range of 0.001 μm to 25 μm, preferably in the range of 0.01 μm to 2 μm.

The matrix materials may be selected from a group consisting of polyethylene oxide (PEO), polyvinylidene fluoride (PVDF), polytetrafluoroethylene (PTTFE), polyurethane, polyacrylonitrile (PAN), polymethyl methacrylate (PMMA), polytetraethylene glycol diacrylate, and copolymers and mixtures thereof. Preferred matrix materials are PVDF and/or PEO and copolymers thereof. PVDF copolymers include PVDF:HFP (polyvinylidene fluoride:hexafluoropropylene) and PVDF:CTFE (polyvinylidene fluoride:chlorotrifluoroethylene).

Preferred materials for the polymer microporous film layer 132 are polyolefines, among which polyethylene and polypropylene are preferred, and a microporous film containing both the polyethylene and the polypropylene may also be used.

In the present application, the air permeability A of the composite separation film 13 and the thickness B of the side faces 222 should satisfy the following relationship: $0.05$ $s/(100~mL·μm) \leq A/B \leq 1.0~s/(100~mL·μm)$. The preferred range is $0.2~s/(100~mL·μm) \leq A/B \leq 0.75~s/(100~mL·μm)$. The ceramic composite material layer 131 of the composite separation film 13 has two functions. The first function is to avoid short circuit, and the second function is to accommodate the electrolyte.

When $A/B > 1.0~s/(100~mL·μm)$, the air permeability of the composite separation film 13 is high, which leads to a small amount of matrix materials (the binders), thus a limited effectiveness. Meanwhile, the thickness of the side faces 222 is small, so that the reverse thrust given by the side faces 222 to the winding arc surfaces 14 of the electrode assembly 1 is small, thus when the positive plate and the negative plate of the electrode assembly 1 expand and shrink, the ceramic composite material layer 131 of the winding arc surfaces 14 of the electrode assembly 1 may easily be damaged. Besides, as the air permeability is high, when the electrode plates expand and shrink, small particulates shedding from the positive plate and the negative plate may easily clog the composite separation film 13 having a high air permeability, thus leaving a small space for accommodating the electrolyte. More seriously, a flow passage for the electrolyte may be clogged directly, which leads to lithium precipitation, thereby resulting in capacity fade.

When $A/B < 0.05~s/(100~mL·μm)$, the thickness of the side faces 222 is large, thus the reverse thrust given by the side faces 222 to the winding arc surfaces 14 of the electrode assembly 1 is large, and the air permeability of the composite separation film 13 is low, so that when the electrode plates of the electrode assembly 1 expand and shrink, there will be no electrolyte locally due to the large reverse thrust given by the side faces 222 to the winding arc surfaces 14 of the electrode assembly 1. Therefore, the lithium ions cannot pass the composite separation film 13 and lithium precipitation may occur. Even though the winding arc surfaces 14 of the side faces of the electrode assembly 1 are located at the side faces 222, and the local electrolyte may recover under the influence of gravity, it is extremely difficult for the electrolyte to reach an equilibrium concentration.

The preferred range for the air permeability A of the composite separation film is 50-500 s/100 mL. When the air permeability is high, the amount of the matrix material (the binder) in the ceramic composite material layer will be small, thus the binding strength cannot be guaranteed, and when the electrode plates expand or shrink, the ceramic composite material layer 131 is easy to shed; while when the air permeability is low, and when the ceramic composite material layer 131 is subjected to the reverse thrust given by the side faces 222 to the winding arc surfaces 14 of the electrode assembly 1, the electrolyte tends to be absent locally, and lithium precipitation occurs, leading to capacity fade.

The preferred range for the thickness B of the side faces 222 is 400-1200 μm. When the thickness is large, the reverse thrust given to the electrode assembly 1 will be too large, then the winding arc surfaces 14 of the electrode assembly 1 are likely to be locally devoid of electrolyte; while when the thickness is too small, there is no suppressing effect exerted on the deformation of the electrode assembly 1.

The ratio of a size L of the main plane 221 in the direction from one side face 222 to the other 222 (length) to a size W of the main plane 221 in the direction from the bottom 23 to the opening 21 (width) is 1.2-2.5. When the winding arc surfaces 14 of the battery assembly 1 are subjected to the reverse thrust from the side faces 222, local diffusion of the electrolyte to the surroundings may occur in the thrust-bearing area. When the ratio of the length to the width of the main plane 221 is controlled to be 1.2-2.5, the electrolyte diffuses in the width direction of the main plane 221 may recover quickly under the influence of gravity, allowing the concentration of the electrolyte to equilibrate gradually.

With continued reference to FIGS. 1 and 2, the cap assembly 4 comprises a cap plate 41 for sealing the opening 21, a gas discharge portion 42 for release gas within the rechargeable battery and a plug 43 for closing an electrolyte injection hole (not shown) penetrating the cap plate 41. The gas discharge portion 42 is arranged to rupture so as to release the internal gas to the outside when the gas pressure inside the shell 2 exceeds a reference value. Both the positive and the negative terminals 3 are arranged on the cap plate 41.

The side faces 222 may be provided with a step on the top to facilitate welding of the side faces 222 with the cap plate 41 adjacent to the opening 21, thereby allowing the side faces 222 to exhibit different thicknesses, and look thick at bottom and thin at top. In this case, the thickness B of the side faces 222 of the present application refers to a thickness of an area corresponding to the electrode assembly 1, i.e., the thickness of thicker areas of the side faces 222.

In the present application, the electrolyte preferably contains nonaqueous solvents capable of dissolving lithium salts. There is no particular limitation on the lithium salts, and $LiPF_6$ and $LiBF_4$, for example, are preferred. Two or more of these lithium salts may be used in combination There is no particular limitation on nonaqueous solvents, and ethylene carbonate (EC), dimethyl carbonate (DMC), diethyl carbonate (DEC) and ethyl methyl carbonate (EMC) are preferred. These nonaqueous solvents may be used alone or in combination of two or more.

This will be further described with reference to the following non-limitative examples Preparation Example 1

Preparation of the positive plate 11: The active material, i.e., lithium cobaltate, the binder, i.e., PVDF (polyvinylidene fluoride) and conductive carbon black were mixed in a ratio of 90 wt % of lithium iron phosphate, 5 wt % of PVDF and 5 wt % of conductive carbon black. NMP (N-methyl pyrrolidone) was used as the solvent for the mixture to make the positive active material layer 113. The positive active material layer 113 was applied onto the surface of an aluminium foil used as the positive current collector 112 having a thickness of 15 μm and subjected to drying, and an uncoated area existing in the width direction of the positive current collector 112 was cut in predetermined distance to obtain the first extension portion 111, thus preparing the positive plate 11.

Preparation of the negative plate 12: The active material, i.e., artificial graphite, the binder, i.e., SBR (styrene-butadiene rubber latex), sodium carboxymethylcellulose and the conductive carbon black were mixed in a ratio of 95 wt % of artificial graphite, 1.5 wt % of sodium carboxymethylcellulose, 1.5 wt % of conductive carbon black, and 2 wt % of styrene-butadiene rubber latex. Water was used as the solvent to make the negative active material layer 123. The negative active material layer 123 was applied onto two sides of an aluminium foil used as the negative current collector 122 having a thickness of 10 nm and subjected to drying, and an uncoated area existing in the width direction of the negative current collector 122 was cut in predetermined distance to obtain the second extension portion 121, thus preparing the negative plate 12.

Preparation of the composite separation film 13: a Celgard polyethylene microporous film was used as the polymer microporous film layer 132, silicon dioxide, calcium carbonate and PVDF:HFP were mixed in a ratio of 30:30:40, and the mixed solution was coated on the Celgard polyethylene microporous film to form the ceramic composite material layer 131, thus preparing the composite separation film 13.

Preparation of the electrolyte: $LiPF_6$ was dissolved in a solvent mixture consisting of the ethylene carbonate (EC), the dimethyl carbonate (DMC) and the ethyl methyl carbonate (EMC) in a volume ratio of 1:1:1 to obtain a $LiPF_6$ solution having a concentration of 1 mol/L, thus preparing the non-aqueous electrolyte.

The positive plate 11, the negative plate 12 and the composite separation film 13 arranged therebetween having an air permeability A of 250 s/100 mL were wound together to form an electrode assembly having a substantially oval cross section (i.e., there are winding arc surfaces 14 at the side faces of the electrode assembly 1). The electrode assembly 1 was placed within the shell 2 such that the first extension portion 111 and the second extension portion 121 are directed towards the opening 21. The side faces 222 have a thickness B of 400 μm and have a planar shape. The first extension portion 111 and the second extension portion 121 were electrically connected with the electrode terminals 3 on the cap assembly 4 respectively (the first extension portion 111 was connected with the positive terminal, and the second extension portion 121 was connected with the negative terminal), the electrolyte was injected via the electrolyte injection hole, and the electrolyte injection hole was sealed by the plug 43. Thus, a prismatic lithium secondary battery was ultimately obtained, the battery has a side wall 22 having main planes 221 with a length L of 173 mm and a width W of 85 mm, the distance between the electrode assembly 1 and the side wall 22 of the shell 2 is 0.5 mm, and the side faces 222 have a planar shape.

Comparative Example 1

Figure 8:
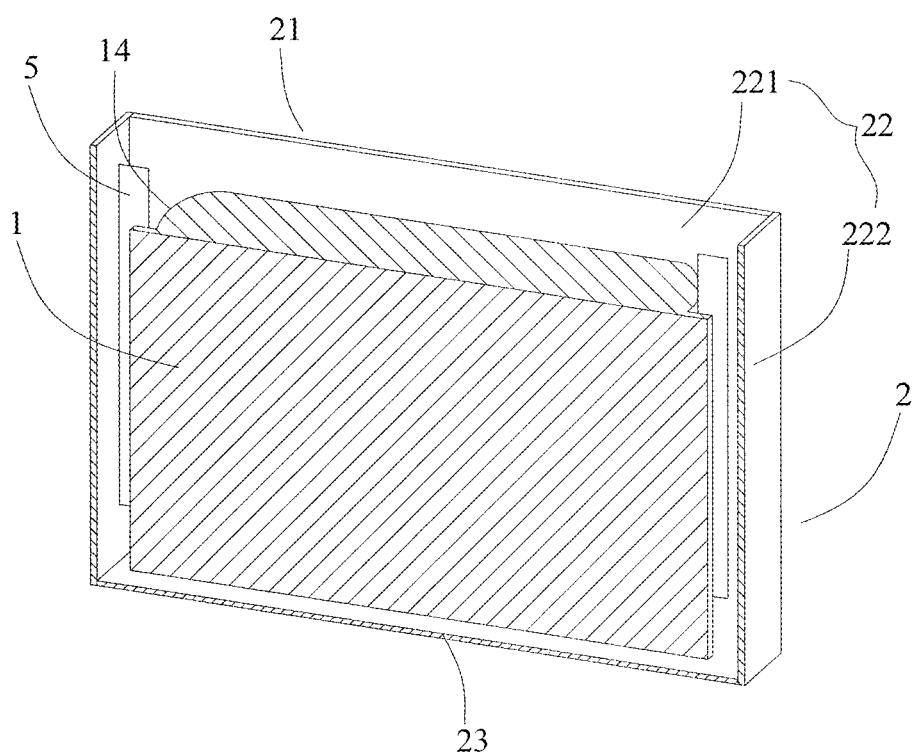
FIG. 8 is a partial schematic view of an internal structure of the lithium secondary battery introduced in the background of the present application.

Preparation of the composite separation film 13 and the electrolyte is the same as that of preparation Example 1. The positive plate 11 and the negative plate 12 used the same active materials, binders, conductive agents and solvents, but there is no first extension portion 111 or second extension portion 121, as shown in FIG. 8. Uncoated areas of the positive current collector 112 and the negative current collector 122 were welded with the collector plates 5, so as to be electrically connected with the electrode terminal 3 on the cap assembly 4. Thus, a prismatic lithium secondary battery was ultimately obtained whose side wall 22 of the shell has main planes 221 with a length L of 173 mm and a width W of 85 mm, the distance between the electrode assembly 1 and the side wall 22 of the shell 2 is 5 mm, and the side faces 222 have a thickness B of 400 μm and a planar shape.

Preparation examples 2-10 and comparative examples 2-3 used the same preparation method as the preparation example 1, but the air permeability A of the composite separation film and the thickness B of the side faces 222 of the side wall 22 are different. The specific parameters are presented in table 1. The lithium secondary batteries of the preparation examples 1-10 and comparative examples 2-3 all have the same profile as shown in FIG. 2.

Tests will be carried out below with respect to preparation examples 1-10 and comparative examples 1-3.
1. Battery Performance Assessment Nailing tests will be performed to assess the short circuit preventing function of the composite material layer of the separation film of the battery, and capacity of the battery will be assessed from the capacity retention ratio after 200 cycles.
2. Nailing Tests All batteries were charged by a charge current of 850 mA to a cut-off voltage of 4.35 V. The nailing test was performed at a temperature of 20° C. by penetrating a round nail having a diameter of 2.7 mm into the side faces of the side wall of the charged battery at a rate of 5 mm/sec, and then a thermocouple provided on the side wall of the battery was used to measure the temperature of the battery and the temperature of the battery at the time 90 seconds after being penetrated was recorded.

3. Capacity Tests

The first charge and discharge were carried out at a temperature of 25° C., and a constant-current constant-voltage charge was performed at a charge current of 0.7 C (i.e., a current value at which a theoretical capacity is completely discharged within 2 hours) until an upper limit voltage of 4.4 V was reached, then a constant-current discharge was performed at a discharge current of 0.5 C until an ultimate voltage of 3V was reached. The discharge capacity of the first cycle was recorded. After that, 200 cycles of charge and discharge were performed, and the discharge capacity of the $200^{th}$ cycle was recorded.

The computation formula for capacity retention ratio is: cycle capacity retention ratio=(discharge capacity of the $200^{th}$ cycle/discharge capacity of the first cycle)×100%. The calculation results are shown in table 1.

TABLE 1

| Preparation Examples and comparative Examples | Air permeability A of the composite separation film/ (s/100 mL) | Thickness B of the side faces/ μm | A/B | Temperature at the time 90 s after nailing test/° C. | Capacity retention ratio/% |
| --- | --- | --- | --- | --- | --- |
| Preparation Example 1 | 250 | 400 | 0.625 | 89 | 85 |
| Preparation Example 2 | 250 | 600 | 0.420 | 86 | 82 |
| Preparation Example 3 | 250 | 800 | 0.3125 | 86 | 81 |
| Preparation Example 4 | 250 | 1000 | 0.250 | 84 | 79 |
| Preparation Example 5 | 50 | 800 | 0.0625 | 85 | 84 |
| Preparation Example 6 | 200 | 800 | 0.25 | 86 | 82 |
| Preparation Example 7 | 400 | 800 | 0.50 | 89 | 80 |
| Preparation Example 8 | 500 | 800 | 0.625 | 90 | 78 |
| Preparation Example 9 | 60 | 1200 | 0.05 | 81 | 77 |
| Preparation Example 10 | 400 | 400 | 1.00 | 93 | 75 |
| Comparative Example 1 | 250 | 400 | 0.625 | 115 | 70 |
| Comparative Example 2 | 50 | 1200 | 0.04 | 92 | 60 |
| Comparative Example3 | 500 | 400 | 1.25 | 120 | 64 |

Comparisons are made between preparation examples 1-10 and comparative examples 2 and 3. When A is 50-500 s/100 mL, B is 400-1200 μm, and the numerical value of A/B is 0.05-1.0, the lithium secondary batteries all have a low temperature at the time 90 seconds after the nailing test and a high the capacity retention ratio after 200 cycles. This is because within the above range, the reverse thrust given by the side faces to the electrode assembly is controlled within a certain range, which solves the safety problem by preventing deformation of the electrode assembly and prevents occurrence of lithium precipitation, thereby allowing the ceramic composite material layer of the separation film to accommodate the electrolyte successfully and enabling the electrolyte to circulate so as to solve the problem of capacity fade.

When A/B>1.0 s/(100 mL·μm), as shown in the comparative EXAMPLE 3, the air permeability A of the composite separation film is high, which leads to a small amount of the matrix materials (the binders), thus a limited effectiveness. Meanwhile the thickness of the side faces is small, so that the reverse thrust given by the side faces to the winding arc surfaces of the electrode assembly is, small, thus when the electrode plates of the electrode assembly expand and shrink, the ceramic composite material layer of the winding arc surfaces of the electrode assembly may easily be damaged. Therefore, the electrode assembly has a temperature of 120° C. after the nailing test. Besides, as the air permeability is high, when the positive plate and the negative plate expand and shrink, small particulates shedding from the positive plate and the negative plate may easily clog the separation film having a high air permeability, thereby resulting in a small space for accommodating the electrolyte. More seriously, a flow passage for the electrolyte may be clogged directly, which leads to lithium precipitation, thereby causing the capacity to fade to 64%.

When $A/B<0.05$ s/(100 mL·μm), as shown in the comparative EXAMPLE 2, the thickness of the side faces is large, and the reverse thrust given to the winding arc surfaces of the electrode assembly is large. Although the safety performance can be well maintained, the air permeability of the composite separation film is small. Thus, when the electrode plates of the electrode assembly expand and shrink, there will be no electrolyte locally due to the large reverse thrust given by the side faces to the electrode assembly, and lithium precipitation may occur as the lithium ions cannot pass the composite separation film 13, thereby causing the capacity to be reduced to 60%. Comparisons are made between the preparation examples 1-10 and the comparative example 1. After the nailing test, the electrode assembly has a high temperature of 115° C., but the capacity retention ratio is only 70%. This is because the electrode assembly of comparative example 1 does not have the extensions as shown in preparation examples 1-10 which protrude from the electrode assembly in the width direction of the main planes, but is welded with the collector plates through the uncoated areas of the positive current collector and the negative current collector, thus collector plate members are arranged between the electrode assembly and the side faces of the side wall of the battery shell. As there are collector plates in the prismatic battery of comparative example 1, the same shell may accommodate different numbers of coils of plates, resulting in a reduced volumetric energy density of comparative example 1. Meanwhile, when the electrode assembly expands and shrinks due to charge and discharge of the battery, the side faces of the side wall of the shell of comparative example 1 cannot give the reverse thrust to the winding arc surfaces at the side faces of the electrode assembly which are most affected by the expansion and shrinkage, and shedding of the ceramic composite material layer in the separation film cannot be suppressed, thereby resulting in the internal short circuit, and the capacity may decrease significantly due to the short circuit. In the preparation examples 1-10, the winding arc surfaces of the side faces of the electrode assembly are located at side faces of the side wall of the shell, and the tight fit between the battery assembly and the shell allows the shell to give the reverse thrust to the electrode assembly sensitively, thereby preventing the ceramic composite material layer of the separation film from shedding. Meanwhile, as the extensions of the electrode assembly protrude from the electrode assembly in the width direction of the main planes of the side wall of the shell, even though the electrolyte may diffuse to the surroundings due to a reduction in local concentration when the electrode assembly is subjected to the reverse thrust, the electrolyte may recover under the influence of gravity, allowing the concentration of the electrolyte to equilibrate gradually.

The above descriptions are merely preferred embodiments of the present application and are not intended to limit the present application. Those skilled in the art will appreciate that numerous modifications and changes may be made. Modifications, equivalents, improvements and the like made within the spirit and principle of the present application should all fall within the protection scope of the present application.

The invention claimed is:

1. A lithium secondary battery, comprising a shell having a bottom, a side wall and an opening; a cap assembly covering the opening; a positive terminal and a negative terminal arranged on the cap assembly; an electrode assembly and electrolyte arranged in a cavity surrounded by the shell and the cap assembly; wherein:
   the side wall comprises a pair of main planes and a pair of side faces, the main planes and the side faces are arranged alternatively around the edge of the bottom, and the opening is arranged opposite to the bottom, wherein the side faces are in a curved arc surface configuration;
   the electrode assembly is formed by winding a positive plate, a negative plate and a composite separation film arranged between the positive plate and the negative plate, wherein a surface of the electrode assembly comprises an arc surface, the arc surface has a shape matching one of the side faces of the shell; wherein the composite separation film comprises at least one polymer microporous film layer and at least one ceramic composite material layer;
   a plurality of first extension portions extend from one end of the positive plate facing the cap assembly and are electrically connected with the positive terminal;
   a plurality of second extension portions extend from one end of the negative plate facing the cap assembly and are electrically connected with the negative terminal;
   the plurality of first extension portions and the plurality of second extension portions are led out from a same end of the electrode assembly facing the cap assembly, rather than from both sides of the electrode assembly; and
   an air permeability A of the composite separation film and a thickness B of the side face satisfy the following relationship:

$$0.05 \text{ s}/(100 \text{ mL·μm}) \leq A/B \leq 1.0 \text{ s}/(100 \text{ mL·μm}),$$
   wherein the thickness $B$ of the side faces is 400-1200 μm.

2. The lithium secondary battery according to claim 1, wherein, the air permeability A of the composite separation film and the thickness B of the side faces satisfy the following relationship:

$$0.2 \text{ s}/(100 \text{ mL·μm}) \leq A/B \leq 0.75 \text{ s}/(100 \text{ mL·μm}).$$

3. The lithium secondary battery according to claim 1, wherein, the air permeability A of the composite separation film is 50-500 s/100 mL.

4. The lithium secondary battery according to claim 1, wherein, a ratio of a size L of the main planes in a direction from one side face to the other to a size W of the main planes in a direction from the bottom to the opening is 1.2-2.5.

5. The lithium secondary battery according to claim 1, wherein,
   the positive plate comprises a positive current collector and a positive active material layer coated on the surface of the positive current collector, and the plurality of first extension portions extend from the positive current collector; and
   the negative plate comprises a negative current collector and a negative electrode active material layer coated on the surface of the negative current collector, and the plurality of second extension portions extend from the negative current collector.

6. The lithium secondary battery according to claim 5, wherein the plurality of first extension portions and the plurality of second extension portions are in the form of a trapezoid, and an upper base of the trapezoid extends away from the electrode assembly.

7. The lithium secondary battery according to claim 5, wherein, a joint of each of the plurality of first extension portions and the positive current collector has a circular arc transition edge, the bottom of each of the plurality of second extension portions and the negative current collector also have a circular arc transition edge, and the circular arcs both have a radius of 0.5 mm-20 mm.

8. The lithium secondary battery according to claim 5, wherein, top portions of the plurality of first extension portions and the plurality of second extension portions are both provided with a rounded chamfer with a radius of 0.5 mm-20 mm.

9. The lithium secondary battery according to claim 1, wherein, the ceramic composite material layer comprises inorganic particles and matrix materials.

10. The lithium secondary battery according to claim 2, wherein, the air permeability A of the composite separation film is 50-500 s/100 mL, and the thickness B of the side faces is 400-1200 μm.

11. The lithium secondary battery according to claim 2, wherein, a ratio of a size L of the main planes in a direction from one side face to the other to a size W of the main planes in a direction from the bottom to the opening is 1.2-2.5.

12. The lithium secondary battery according to claim 2, wherein,
the positive plate comprises a positive current collector and a positive active material layer coated on the surface of the positive current collector, and the plurality of first extension portions extend from the positive current collector; and
the negative plate comprises a negative current collector and a negative electrode active material layer coated on the surface of the negative current collector, and the plurality of second extension portions extend from the negative current collector.

13. The lithium secondary battery according to claim 12, wherein the plurality of first extension portions and the plurality of second extension portions are in the form of a trapezoid, and an upper base of the trapezoid extends away from the electrode assembly.

14. The lithium secondary battery according to claim 12, wherein, a joint of each of the plurality of first extension portions and the positive current collector has a circular arc transition edge, the bottom of each of the plurality of second extension portions and the negative current collector also have a circular arc transition edge, and the circular arcs both have a radius of 0.5 mm-20 mm.

15. The lithium secondary battery according to claim 12, wherein, top portions of the plurality of first extension portions and the plurality of second extension portions are both provided with a rounded chamfer with a radius of 0.5 mm-20 mm.

16. The lithium secondary battery according to claim 2, wherein, the ceramic composite material layer comprises inorganic particles and matrix materials.

* * * * *